(12) United States Patent
Huang

(10) Patent No.: US 10,849,136 B2
(45) Date of Patent: Nov. 24, 2020

(54) WIRELESS RESOURCE-ALLOCATION SYSTEM AND METHOD

(71) Applicant: Wistron NeWeb Corp., Hsinchu (TW)

(72) Inventor: Ying-Hui Huang, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 83 days.

(21) Appl. No.: 16/218,716

(22) Filed: Dec. 13, 2018

(65) Prior Publication Data

US 2020/0107332 A1   Apr. 2, 2020

(30) Foreign Application Priority Data

Sep. 28, 2018   (TW) .............................. 107134247 A

(51) Int. Cl.
| | | |
|---|---|---|
| *H04W 72/10* | (2009.01) | |
| *H04W 12/06* | (2009.01) | |
| *H04W 8/26* | (2009.01) | |
| *H04W 72/12* | (2009.01) | |
| *H04W 48/14* | (2009.01) | |
| *H04W 76/10* | (2018.01) | |
| *H04W 84/18* | (2009.01) | |

(52) U.S. Cl.
CPC ............. *H04W 72/10* (2013.01); *H04W 8/26* (2013.01); *H04W 12/06* (2013.01); *H04W 48/14* (2013.01); *H04W 72/1242* (2013.01); *H04W 72/1247* (2013.01); *H04W 76/10* (2018.02); *H04W 84/18* (2013.01)

(58) Field of Classification Search
None
See application file for complete search history.

(56) References Cited

U.S. PATENT DOCUMENTS

| | | | |
|---|---|---|---|
| 2012/0156985 A1 | 6/2012 | Li et al. | |
| 2020/0053095 A1* | 2/2020 | Friant | .................. H04L 63/102 |

FOREIGN PATENT DOCUMENTS

| | | |
|---|---|---|
| CN | 101668314 B | 12/2012 |
| CN | 106209430 A | 12/2016 |

* cited by examiner

*Primary Examiner* — Diane L Lo
(74) *Attorney, Agent, or Firm* — McClure, Qualey & Rodack, LLP

(57) ABSTRACT

A wireless resource-allocation system applied in a Wi-Fi mesh network is provided. The wireless resource-allocation system includes a target device, a first wireless access device, a second wireless access device, a third wireless access device, and a server. The first wireless access device obtains address information of the target device from the probe request from the target device. The third wireless access device receives the address information of the target device from the first wireless access device and sends a confirmation response. The confirmation response is generated according to the address information. Responsive to that the confirmation response indicates that the target device passes authentication, the first wireless access device and the third wireless access device provide the target device with a highest priority in the Wi-Fi mesh network.

17 Claims, 4 Drawing Sheets

WIRELESS RESOURCE-ALLOCATION SYSTEM AND METHOD

CROSS REFERENCE TO RELATED APPLICATIONS

This application claims priority of Taiwan Patent Application No. 107134247, filed on Sep. 28, 2018, the entirety of which is incorporated by reference herein.

BACKGROUND OF THE INVENTION

Field of the Invention

The present invention relates to a wireless resource-allocation technology, and in particular to a wireless resource-allocation technology that can determine whether a target device has a high priority in a Wi-Fi mesh network according to the address information of the target device.

Description of the Related Art

With the advancement in recent years of wireless network communication technology, the demand for wireless resources has likewise increased. In cases where the bandwidth of a wireless local area network (WLAN) environment is limited, Wi-Fi Alliance proposes a Wi-Fi Multimedia (WMM) standard for transmission of different types of multimedia signals. The WMM standard is a mechanism for a network resource configuration which is developed from Quality of Service (QoS) defined by IEEE 802.11. In the WMM standard, the transmitted multimedia signals are divided into four types, which are respectively arranged in the order of priority: voice, video, best effort, and background. The WMM standard defines different idle times allocated to the multimedia signals with four different priorities, wherein the idle time allocated to the multimedia signals with the higher priority is shorter, and the probability of accessing a wireless network therefor is higher.

Moreover, in a Wi-Fi mesh network, multiple wireless access devices (for example, an access point (AP) or a wireless router) are usually configured, so that users can get network services anywhere (for example: different locations in the home). However, in a Wi-Fi network, due to the limitations induced by the WMM standard, when a target device needs to obtain the best quality of service (that is, to obtain the highest priority), a wireless access device connected with the target device cannot guarantee that it will provide network resources to the target device first.

BRIEF SUMMARY OF THE INVENTION

In view of the above problems in the prior art, the present invention provides a wireless resource allocating technology to a wireless resource-allocation system and method which can determine whether a target device has a high priority in the Wi-Fi mesh network according to the address information of the target device.

An exemplary embodiment of a wireless resource-allocation system is provided. The wireless resource-allocation system is applied in a Wi-Fi mesh network. The wireless resource-allocation system includes a target device, a first wireless access device, a second wireless access device, a third wireless access device and a server. The first wireless access device receives a probe request from a target device and obtains address information of the target device from the probe request. The third wireless access device receives the address information of the target device from the first wireless access device and sends a confirmation response. The confirmation response is generated according to the address information. The third wireless access device is connected to a wide area network to provide a network service to the first wireless access device. Responsive to that the confirmation response indicates that the target device passes authentication, the first wireless access device and the third wireless access device provide the target device with a highest priority in the Wi-Fi mesh network.

An exemplary embodiment of a wireless resource-allocation method is provided. The wireless resource-allocation method is applied to a wireless resource-allocation system. The wireless resource-allocation method comprises the following steps: of, by a first wireless access device of the wireless resource-allocation system receiving a probe request from a target device and obtaining address information of the target device from the probe request; by a third wireless access device of the wireless resource-allocation system receiving the address information of the target device from the first wireless access device, wherein the third wireless access device is connected to a wide area network to provide a network service to the first wireless access device and a second wireless access device of the wireless resource-allocation system; by the third wireless access device, sending a confirmation response, wherein the confirmation response is generated according to the address information; and by the first wireless access device and the third wireless access device, providing the target device with a highest priority in a Wi-Fi mesh network responsive to that the confirmation response indicates that the target device passes authentication.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
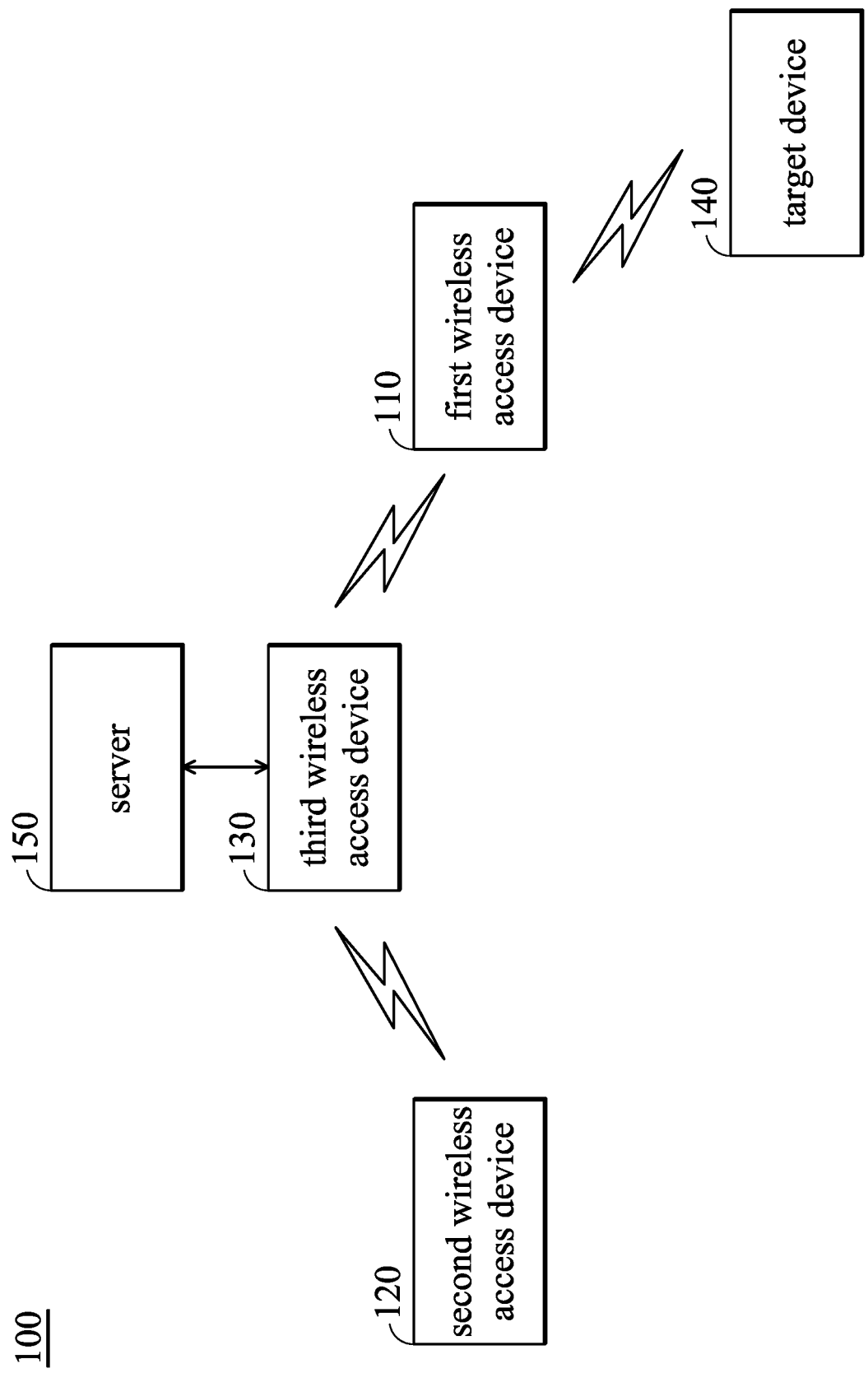
FIG. 1A is a block diagram of a wireless resource-allocation system 100 according to one embodiment of the invention.

FIG. 1A is a block diagram showing a wireless resource-allocation system 100 according to an embodiment of the present invention. The wireless resource-allocation system 100 is adapted to architecture of a Wi-Fi mesh network. As shown in FIG. 1A, the wireless resource-allocation system 100 may comprise a first wireless access device 110, a second wireless access device 120, a third wireless access device 130, a target device 140, and a server 150. It should be noted that the block diagram shown in FIG. 1A are merely for convenience of description of the embodiments of the present invention, but the invention is not limited thereto. The wireless resource-allocation system 100 may comprise other wireless access devices and other electronic devices.

According to an embodiment of the present invention, the first wireless access device 110, the second wireless access device 120, and the third wireless access device 130 may be wireless access points (APs) or wireless routers. (Router), but the invention is not limited thereto. The first wireless access device 110, the second wireless access device 120, and the third wireless access device 130 may be connected to their neighboring wireless access devices in a wireless or wired manner. In addition, the first wireless access device 110, the second wireless access device 120, and the third wireless access device 130 may provide network services to electronic devices connected thereto (in a wired or wireless manner). Moreover, according to an embodiment of the present invention, the third wireless access device 130 may be a broad gateway. The third wireless access device 130 may be connected to a wide area network (WAN) in a wired manner (for example, through a cable or optical fiber) or a wireless manner, and may allow a local area network (LAN) to be connected to the wide area network to provide services from the remote network to the electronic devices connected to the first wireless access device 110, the second wireless access device 120, and the third wireless access device 130. In addition, in the embodiment of the present invention, the third wireless access device 130 is coupled to the server 150 to transmit messages to the server 150.

According to an embodiment of the present invention, the target device 140 may be a smartphone, a tablet computer, a notebook computer, a host, or a set-top box, but the invention is not limited thereto. Moreover, in accordance with an embodiment of the present invention, the target device 140 represents an electronic device that requires obtaining the highest priority service in a Wi-Fi mesh network. Specifically, "requires obtaining the highest priority service" described in the present invention is determined based on whether or not the target device 140 passes authentication. That is, in cases where the target device 140 passes the authentication, no matter what service the target device 140 requires, the target device 140 will have the highest priority as long as the service required by the target device 140 is transmitted in the Wi-Fi mesh network. In addition, the data packets corresponding to the authenticated target device 140 may have a higher priority order in the transmitting/receiving queue and may have a longer air time allocation. Moreover, it should be noted that in the embodiment of the present invention, only the target device 140 is taken as an example for description, but the invention is not limited thereto. In some embodiments of the present invention, the wireless resource-allocation system 100 may comprise a plurality of target devices. When multiple target devices are authenticated successfully by the server 150, the authenticated target devices will receive the highest priority service in the Wi-Fi mesh network. For example, in cases where there are two target devices in the Wi-Fi mesh network, when both target devices are successfully authenticated by the server 150, both target devices will receive the highest priority service in the Wi-Fi mesh network. When there are data packets provided to the two target devices in the Wi-Fi mesh network, the network resources can be equally divided to simultaneously transmit the data packets to the two target devices.

According to an embodiment of the invention, the server 150 may be configured as a local server in a Wi-Fi mesh network (local network), and it comprises a local database. According to another embodiment of the present invention, the server 150 may be configured as a remote server in a remote network, and is comprises a remote database. According to the embodiment of the present invention, the database of the server 150 stores authentication information corresponding to all the target devices and determines whether there is, among the stored authentication information, any authentication information which matches the target device requiring authentication. When there is matching authentication information, the server 150 determines that the target device has been successfully authenticated. When there is no matching authentication information, the server 150 determines the target device fails the authentication. According to an embodiment of the present invention, the authentication information may include the media access control (MAC) addresses of all the target devices, but the invention is not limited thereto.

Figure 2:
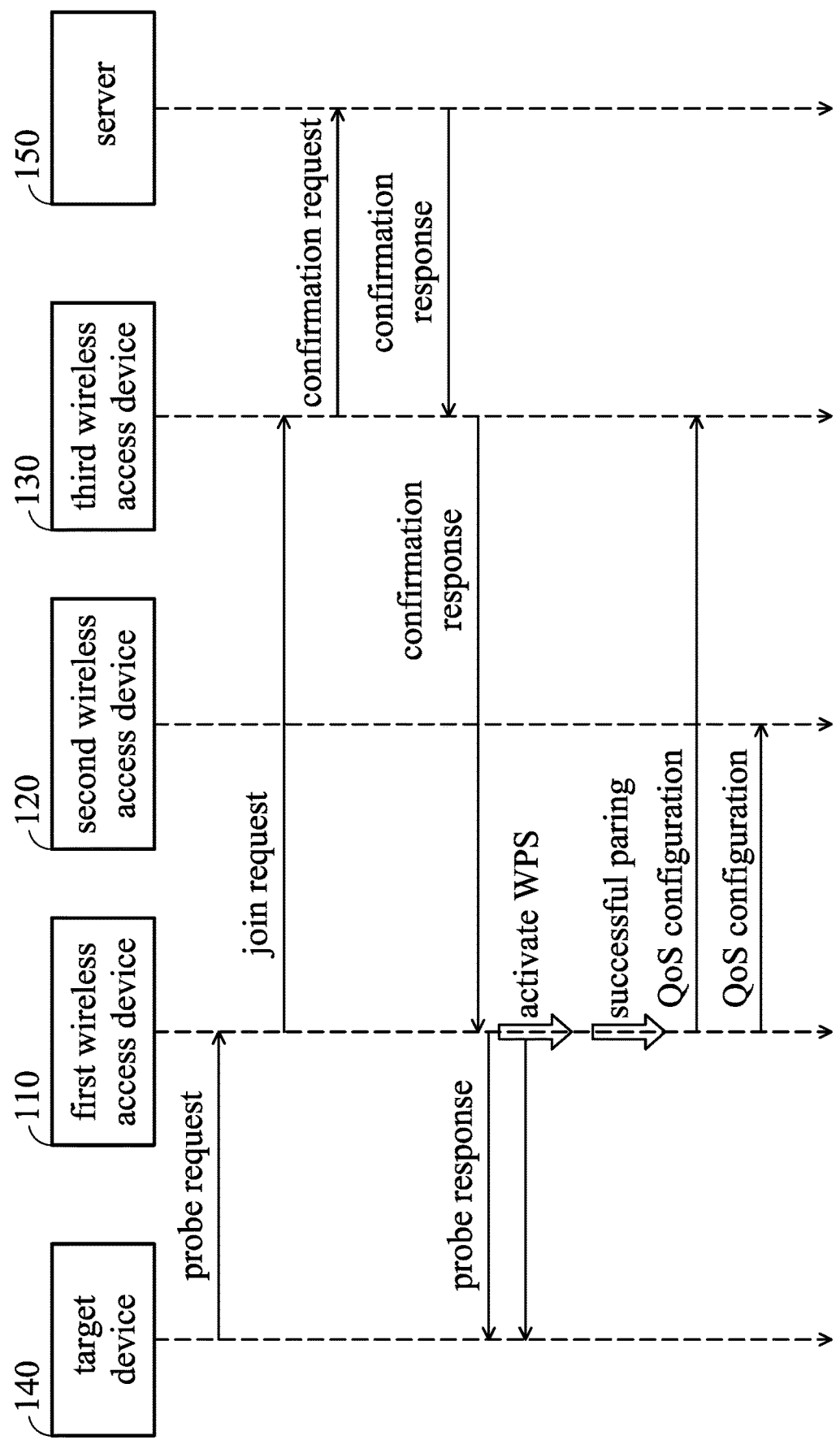
FIG. 2 is a schematic diagram showing an operation of a wireless resource-allocation system 100 according to an embodiment of the invention.

According to another embodiment of the present invention, the third wireless access device 130 may comprise a local database. The local database of the third wireless access device 130 may store the authentication information corresponding to all the target devices. That is, in the embodiment, the target devices can be directly authenticated by the third wireless access device 130 without authentication performed by the server 150. In the embodiment of FIG. 2, the authentication is performed by the server 150, but the invention is not limited thereto.

Figure 1B:
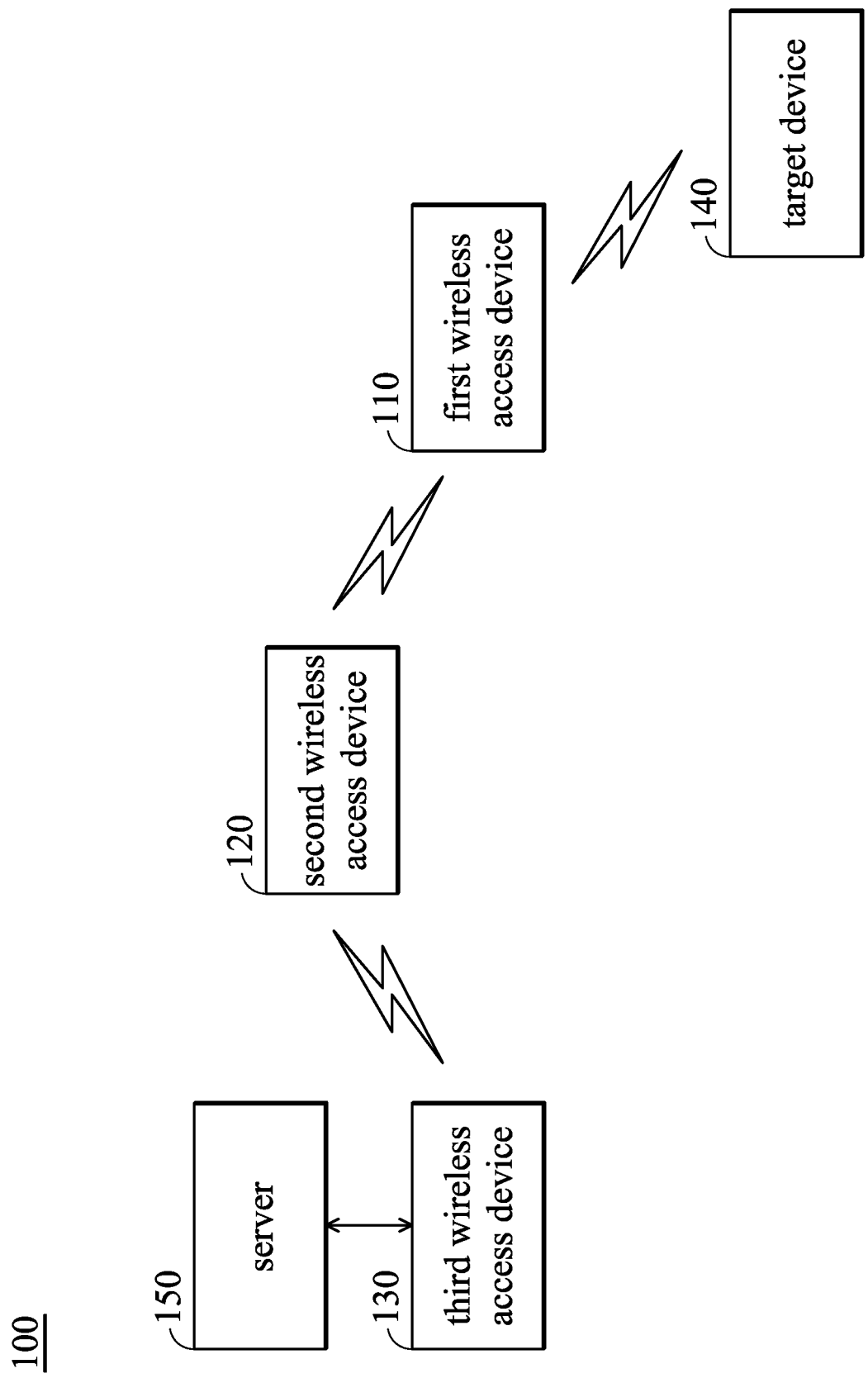
FIG. 1B is a block diagram of a wireless resource-allocation system 100 according to another embodiment of the invention.

FIG. 2 is a schematic diagram showing an operation of a corresponding wireless resource-allocation system 100 according to an embodiment of the present invention. Referring to FIG. 2, according to an embodiment of the present invention, when the target device 140 activates Wi-Fi paring, the target device 140 broadcasts or sends a probe request first to probe whether there is a wireless access device around the target device 140. The probe request may include address information of the target devices 140, for example, a media access control (MAC) address. In a Wi-Fi mesh network, all wireless access devices detect whether there is any probe request around them. When a wireless access device (such as, the first wireless access device 110) receives a probe request broadcast by the target device 140, the wireless access device 110 may retrieve address information in the probe request. Next, the first wireless access device 110 sends a join request to the third wireless access device 130 to inform the third wireless access device 130 that a target device 140 wants to join the Wi-Fi mesh network. Specifically, when there is another wireless access device between the first wireless access device 110 and the third wireless access device 130, the first wireless access device 110 also sends a join request first to the wireless access device, and then the wireless access device then sends the join request to the third wireless access device 130 by the wireless access device. Taking FIG. 1B as an example, the second wireless access device 120 is disposed between the first wireless access device 110 and the third wireless access device 130. The first wireless access device 110 sends a join request first to the second wireless access device 120, and the second wireless access device 120 then sends the join request to the third wireless access device 130. According to an embodiment of the present invention, the join request may include the address information of the target device 140.

Referring to FIG. 2, after the third wireless access device 130 receives the join request, when the target device 140 is an electronic device that has not been previously authenticated, the third wireless access device 130 sends a confirmation request to the server 150 to request the server 150 to confirm whether the target device 140 is an electronic device that needs to obtain the highest priority service in the wireless mesh network. According to the embodiment of the present invention, the confirmation request may include the address information of the target device 140. The server 150 determines whether the address information of the target device 140 conforms to the stored authentication information according to the address information of the target device 140 to determine whether the target device 140 passes authentication. The server 150 sends a confirmation response to the third wireless access device 130 to inform the third wireless access device 130 whether the target device 140 passes authentication. When the target device 140 passes the authentication, the third wireless access device 130 then sends the confirmation response to the first wireless access device 110 to inform the first wireless access device 110 that the target device 140 has passes authenticated successfully by the server 150. According to an embodiment of the invention, the information about that the target device 140 has passed the authentication can be stored in a local database. Moreover, in this embodiment, the local database may be disposed in the server 150 or in the third wireless access device 130.

Referring to FIG. 2, after the first wireless access device 110 obtains the confirmation response, the first wireless access device 110 sends a probe response to the target device 140 and automatically performs a pairing operation with the target device 140. The first wireless access device 110 activates a Wi-Fi protected setup (WPS) to pair with the target device 140. After the first wireless access device 110 has successfully been paired with the target device 140, the first wireless access device 110 sends Quality of Service (QoS) provisioning to all other wireless access devices in the Wi-Fi mesh network (such as the second wireless access device 120 and the third wireless access device 130) to inform all the other wireless access devices that the target device 140 needs to obtain the highest priority service in the Wi-Fi mesh network. Therefore, when there is a data packet provided by a remote service network in the Wi-Fi mesh network, each wireless access device determines, according to the final destination address of the data packet, whether the final destination address corresponds to the target device 140 (that is, whether the data packet is to be transmitted to the target device 140). When the final destination address corresponds to the target device 140, each wireless access device determines that the highest priority is needed for the data packet when the data packet is transmitted over the Wi-Fi mesh network. When transmission of the data packet is completed, the network resources can be allocated to other electronic devices in the Wi-Fi mesh network.

In the embodiment of the present invention, when the pairing between the first wireless access device 110 and the target device 140 fails, the target device 140 will not be able to connect to the Wi-Fi mesh network.

According to an embodiment of the present invention, in cases where the first wireless access device 110 or the authenticated target device 140 is turned off and then turned on, since the target device 140 has been authenticated successfully by the server 150, when receiving a join request from the first wireless access device 110, the third wireless access device 130 knows that the target device 140 has passed the authentication according to the information stored in the local database (the local database is disposed in the server 150 or the third wireless access device 130). Therefore, the third wireless access device 130 directly sends a confirmation response to the first wireless access device 110 to inform the first wireless access device 110 that the target device 140 has passed the authentication. That is, in this embodiment, the third wireless access device 130 does not need to resend a confirmation request to the server 150 to request the server 150 to confirm whether the target device 140 is an electronic device that needs to obtain the highest priority service in the wireless mesh network.

According to an embodiment of the invention, when the authenticated target device 140 is moved to the vicinity of another wireless access device (such as, the second wireless access device 120), since the first wireless access device 110 has informed the other wireless access devices that the target device 140 needs to obtain the highest priority service in the Wi-Fi mesh network, the wireless access device to which the target device 140 moves will no longer need to send a confirmation request to the third wireless access device 130. Therefore, when the wireless access device to which the target device 140 is moved has successfully been paired with the target device 140, the target device 140 can obtain the highest priority service in the Wi-Fi mesh network.

According to an embodiment of the present invention, when the target device 140 fails the authentication, the third wireless access device 130 sends a confirmation response to the first wireless access device 110 to inform the first wireless access device 110 that the target device 140 does not pass the authentication. According to an embodiment of the invention, when the first wireless access device 110 obtains the confirmation response, the first wireless access device 110 will not pair with the target device 140: That is, the target device 140 will not be able to connect to the Wi-Fi mesh network. According to another embodiment of the present invention, when the first wireless access device 110 obtains a confirmation response, the first wireless access device 110 is still paired with the target device 140, but the target device 140 cannot obtain the highest priority service in the Wi-Fi mesh network: That is, each wireless access device will transmit the services required by the target device 140 based on a general transmission mechanism (for example, WMM).

Figure 3:
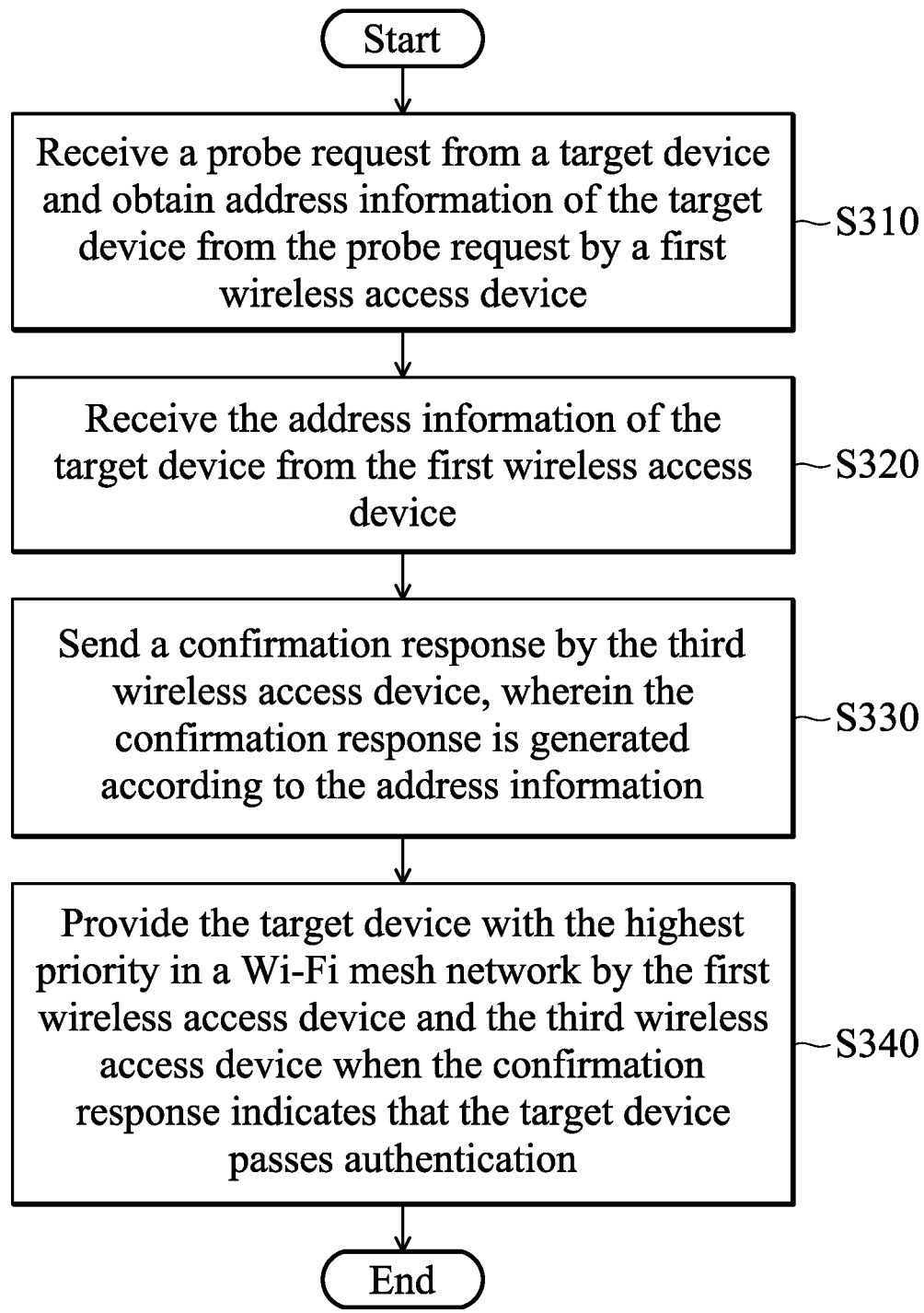
FIG. 3 is flow chart of a wireless resource-allocation method according to an embodiment of the invention.

FIG. 3 is a flow chart 300 of a wireless resource-allocation method according to an embodiment of the present invention. The wireless resource-allocation method can be applied to the wireless resource-allocation system 100 of the present invention. In Step S310, a first wireless access device of the wireless resource-allocation system 100 receives a probe request from a target device and obtains address information of the target device, such as a MAC address, from the probe request of the target device. In Step S320, a third wireless access device of the wireless resource-allocation system 100 receives the address information of the target device from the first wireless access device. In Step S330, the third wireless access device of the wireless resource-allocation system 100 sends a confirmation response, wherein the confirmation response is generated according to the address information. In Step S340, when the confirmation response indicates that the target device passes authentication, the first wireless access device and the third wireless access device of the wireless resource-allocation system 100 provide the target device with the highest priority in a Wi-Fi mesh network.

According to some embodiments of the present invention, the wireless resource-allocation method further comprises: the third wireless access device generates a confirmation response according to the address information and sends the confirmation response to the first wireless access device.

According to some embodiments of the present invention, the wireless resource-allocation method further comprises: a server receives a confirmation request that includes an address request from the third wireless access device, a confirmation response is generated according to the address information, and the confirmation response is sent to the third wireless access device. Then, the third wireless access device sends the confirmation response to the first wireless access device.

According to some embodiments of the present invention, the wireless resource-allocation method further comprises: the first wireless access device sends a probe response to the target device and is paired with the target device when the target device passes the authentication.

According to some embodiments of the present invention, the wireless resource-allocation method further comprises: the first wireless access device informs the second wireless access device and the third wireless access device of the wireless resource-allocation system 100 that the target device has the highest priority in the Wi-Fi mesh network when the first wireless access device has been successfully paired with the target device.

According to some embodiments of the present invention, the wireless resource-allocation method further comprises: according to the final destination address of the data packet, each wireless access device of the wireless resource-allocation system 100 determines whether the final destination address corresponds to the authenticated target device. When the final destination address corresponds to the authenticated target device, each wireless access device determines that the highest priority is needed for the data packet when the data packet is transmitted over the Wi-Fi mesh network.

According to the wireless resource-allocation method proposed by the embodiment of the present invention, when a target device needs to obtain the best quality of service (that is, to obtain the highest priority), whether or not the target device can get the highest priority in the Wi-Fi mesh network can be determined based on the address information of the target device. When the target device passes authentication, the target device can get the highest priority in the Wi-Fi mesh network. Therefore, according to the wireless resource-allocation method proposed by the embodiment of the present invention, when the target device needs to obtain the best quality of service, the required network service will not be limited by the WMM standard.

The serial numbers in the specification and claims, such as "first", "second", etc., are merely for convenience of explanation, and there is no sequential relationship between them.

The steps of the method and algorithm disclosed in the specification of the present invention can be directly applied to a hardware module, a software module, or a combination thereof directly by executing a processor. A software module (including execution instructions and related data) and other data can be stored in a data memory, such as a random access memory (RAM), a flash memory, a read only memory (ROM), an erasable programmable read-only memory (EPROM), an electronic erasable programmable read-only memory (EEPROM), a register, a hard drive, a portable hard drive, a CD-ROM (CD-ROM), a DVD or any other computer readable storage medium in the field of the invention of the present application. A storage medium can be coupled to a machine device, such as a computer/processor (for convenience of description, represented by a processor in this specification). The processor can read information (such as program codes) and write information to the storage medium. The storage medium can be integrated into the processor. A special application integrated circuit (ASIC) includes the processor and the storage medium. A user apparatus includes a special application integrated circuit. In other words, the processor and the storage medium are included in the user apparatus but not directly connected to the user apparatus. Moreover, in some embodiments, any product suitable for a computer program includes a readable storage medium, wherein the readable storage medium includes codes associated with one or more disclosed embodiments. In some embodiments, the product of the computer program can include packaging materials.

The above paragraphs are described using various aspects. Obviously, the teachings herein can be implemented in a variety of ways, and any particular architecture or function disclosed in the embodiments is merely representative. According to the teachings herein, it will be understood by those skilled in the art that the various aspects disclosed herein can be practiced independently or in combination.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wireless resource-allocation system for a Wi-Fi mesh network, comprising:
   a first wireless access device receiving a probe request from a target device and obtaining address information of the target device from the probe request; and
   a third wireless access device receiving the address information of the target device from the first wireless access device and sending a confirmation response, wherein the confirmation response is generated according to the address information, and the third wireless access device is connected to a wide area network to provide a network service to the first wireless access device,
   wherein responsive to that the confirmation response indicates that the target device passes authentication, the first wireless access device and the third wireless access device provide the target device with a highest priority in the Wi-Fi mesh network.

2. The wireless resource-allocation system as claimed in claim 1, wherein the first wireless device receives the confirmation response.

3. The wireless resource-allocation system as claimed in claim 2, wherein responsive to that the target device passes the authentication, the first wireless access device sends a probe response to the target device and performs a pairing operation with the target device.

4. The wireless resource-allocation system as claimed in claim 3, further comprising:
   a second wireless access device obtaining the network service from the third wireless access device,
   wherein responsive to that the first wireless access device has successfully been paired with the target device, the first wireless access device informs the second wireless access device and the third wireless access device that the target device has the highest priority in the Wi-Fi mesh network.

5. The wireless resource-allocation system as claimed in claim 4, wherein the first wireless access device, the second wireless access device, and the third wireless access device determine, according to a final destination address of a data packet, whether the final destination address corresponds to the target device, and responsive to that the final destination address corresponds to the target device, the first wireless access device, the second wireless access device, and the third wireless access device determine that the highest priority is needed for the data packet when the data packet is transmitted over the Wi-Fi mesh network.

6. The wireless resource-allocation system as claimed in claim 1, further comprising:
a server receiving a confirmation request that includes the address information from the third wireless access device, generating the confirmation response according to the address information, and sending the confirmation response to the third wireless access device.

7. The wireless resource-allocation system as claimed in claim 6, wherein the server is a remote server in a remote network or a logcal server in the Wi-Fi mesh network.

8. The wireless resource-allocation system as claimed in claim 1, wherein the third wireless access device generates the confirmation response according to the address information.

9. A wireless resource-allocation method applied to a wireless resource-allocation system, comprising:
by a first wireless access device of the wireless resource-allocation system, receiving a probe request from a target device and obtaining address information of the target device from the probe request;
by a third wireless access device of the wireless resource-allocation system, receiving the address information of the target device from the first wireless access device, wherein the third wireless access device is connected to a wide area network to provide a network service to the first wireless access device of the wireless resource-allocation system;
by the third wireless access device, sending a confirmation response, wherein the confirmation response is generated according to the address information; and
by the first wireless access device and the third wireless access device, providing the target device with a highest priority in a Wi-Fi mesh network responsive to that the confirmation response indicates that the target device passes authentication.

10. The wireless resource-allocation method as claimed in claim 9, further comprising:
by the first wireless access device, receiving the confirmation response.

11. The wireless resource-allocation method as claimed in claim 10, further comprising:
by the first wireless access device, sending a probe response to the target device and performing a pairing operation with the target device responsive to that the target device passes the authentication.

12. The wireless resource-allocation method as claimed in claim 11, further comprising:
informing a second wireless access device of the wireless resource-allocation system and the third wireless access device that the target device has the highest priority in the Wi-Fi mesh network responsive to that the first wireless access device has successfully been paired with the target device.

13. The wireless resource-allocation method as claimed in claim 12, further comprising:
by the first wireless access device, the second wireless access device, and the third wireless access device, determine whether a final destination address of a data packet corresponds to the target device according to the final destination address; and
responsive to determining that the final destination address corresponds to the target device, by the first wireless access device, the second wireless access device, and the third wireless access device, determining that the highest priority is needed for the data packet when the data packet is transmitted over the Wi-Fi mesh network.

14. The wireless resource-allocation method as claimed in claim 12, further comprising:
responsive to that the target device moves to the second wireless access device of the wireless resource-allocation system, by the second wireless access device, performing a pairing operation with the target device; and
the target device having the highest priority in the Wi-Fi mesh network responsive to that the second wireless access device has successfully paired with the target device.

15. The wireless resource-allocation method as claimed in claim 9, further comprising:
by a server, receiving a confirmation request that includes the address information from the third wireless access device, generating the confirmation response according to the address information, and sending the confirmation response to the third wireless access device.

16. The wireless resource-allocation method as claimed in claim 15, wherein the server is a remote server in a remote network or a logcal server in the Wi-Fi mesh network.

17. The wireless resource-allocation method as claimed in claim 9, further comprising:
by the third wireless access device, generating the confirmation response according to the address information.

* * * * *